United States Patent [19]

Kammerer

[11] Patent Number: 4,506,826

[45] Date of Patent: Mar. 26, 1985

[54] TIME-CONTROLLED HEAT REGULATOR WITH NIGHTTIME TEMPERATURE LOWERING CAPABILITY

[75] Inventor: Gerd Kammerer, St. Georgen, Fed. Rep. of Germany

[73] Assignee: Dieter Graesslin Feinwerktechnik, Fed. Rep. of Germany

[21] Appl. No.: 458,548

[22] Filed: Jan. 17, 1983

[30] Foreign Application Priority Data

Jan. 23, 1982 [DE] Fed. Rep. of Germany ....... 3202104

[51] Int. Cl.³ .............................................. F23N 5/20
[52] U.S. Cl. .................................... 236/46 R; 165/12
[58] Field of Search .................. 236/46 R, 47; 165/12

[56] References Cited

U.S. PATENT DOCUMENTS 4,041,325  8/1977  Angott .............................. 236/46 R
4,102,495  7/1978  Rutledge et al. .................. 236/46 R

*Primary Examiner*—William E. Wayner
*Attorney, Agent, or Firm*—Hill, Van Santen, Steadman & Simpson

[57] ABSTRACT

A time-controlled heat regulator has the capability of controlling a heat supply so as to lower the temperature of a heated area during nighttime and to increase the supply of heat in dependence upon outside temperature to begin raising the temperature of the heated area in advance of a point in time at which the heated area is desired to attain a specified temperature. The heat regulator has a time-controlled variable resistor interconnected in a bridge circuit, the variable resistor being cut into the circuit at the beginning of a longest chronologically possible heat-up phase dependent on the outside temperature. The resistance of the variable resistor changes over time until reaching coincidence with the resistance value of an outside temperature sensor. The length of time of the heat-up phase is thus dimensioned backwardly from the time of reaching the desired area temperature as a function of the prevailing outside temperature.

8 Claims, 3 Drawing Figures

TIME-CONTROLLED HEAT REGULATOR WITH NIGHTTIME TEMPERATURE LOWERING CAPABILITY

BACKGROUND OF THE INVENTION

The present invention relates to heat regulators, and in particular to heat regulators having the capability of lowering the temperature of a heated area during nighttime.

Heat regulators are known in the art which control a heat supply so as to lower the temperature of a heated area, such as a room, during nighttime and which begin raising the temperature of the room with a lead time so that the room will reach a desired temperature at a later time. Such conventional regulators generally employ an electrical resistance bridge circuit whose equilibrium is changeable by means of a time-controlled switch instruction from a switch clock which connects or disconnects a resistor. Such conventional regulators, however, exhibit the disadvantage that given high outside temperatures, the nighttime temperature lowering is terminated too early in time relative to the point in time at which the proper room temperature is desired.

SUMMARY OF THE INVENTION

It is an object of the present invention to provide a heat regulator with nighttime temperature lowering capability which terminates nighttime temperature lowering as close as possible to the point in time at which a higher desired room temperature is to be reached.

The above object is inventively achieved in a heat regulator using the lowest outside temperature as the basis for a heat curve as a function of the climactic zone in which the area to be heated is located. These values are utilized to determine the chronological length of time during which heat is supplied to room necessary for reaching the desired room temperature at a selected point in time. The outside temperature thus has a direct influence on the length of the time of heat supply.

The heat regulator disclosed and claimed herein has an electrical time controlled control loop which is also controlled in dependence upon the outside temperature which includes a bridge circuit having an outside temperature detector and a variable resistor whose resistance changes over time, the variable resistor being cut into the bridge circuit by closure of a switch by a timer at the point in time corresponding to the beginning of the longest possible period necessary under a worst-case outside temperature condition which would be needed to bring the room to a desired temperature at a specific time, based on calculations. The resistance of the variable resistor changes over time until its resistance value coincides with the resistance value of the outside temperature sensor, at which time the bridge is balanced and heat is begun to be supplied to the room. At the end of the predetermined period, the timer opens the switch, ceasing supply of heat to the room. The chronological length of the heat-up phase is thus measured backward from the point in time the desired room temperature is reached and as a function of the prevailing outside temperature.

Thus, for example, if the outside temperature sensor exhibits a resistance which happens to correspond to a lowest possible outside temperature, supply of heat to the room begins immediately upon the variable resistor being cut into the bridge circuit by a switch clock because the bridge is immediately balanced. If, however, the prevailing outside temperature is relatively high in comparison to the desired room temperature, coincidence between the chronologically variable resistance value of the variable resistor and the resistance value of the outside temperature sensor occurs at a later point in time within the framework of the time range provided for the heat-up phase, so that supply of heat begins only shortly before that point in time at which the desired room temperature is to be reached.

DESCRIPTION OF THE PREFERRED EMBODIMENTS

Figure 1:
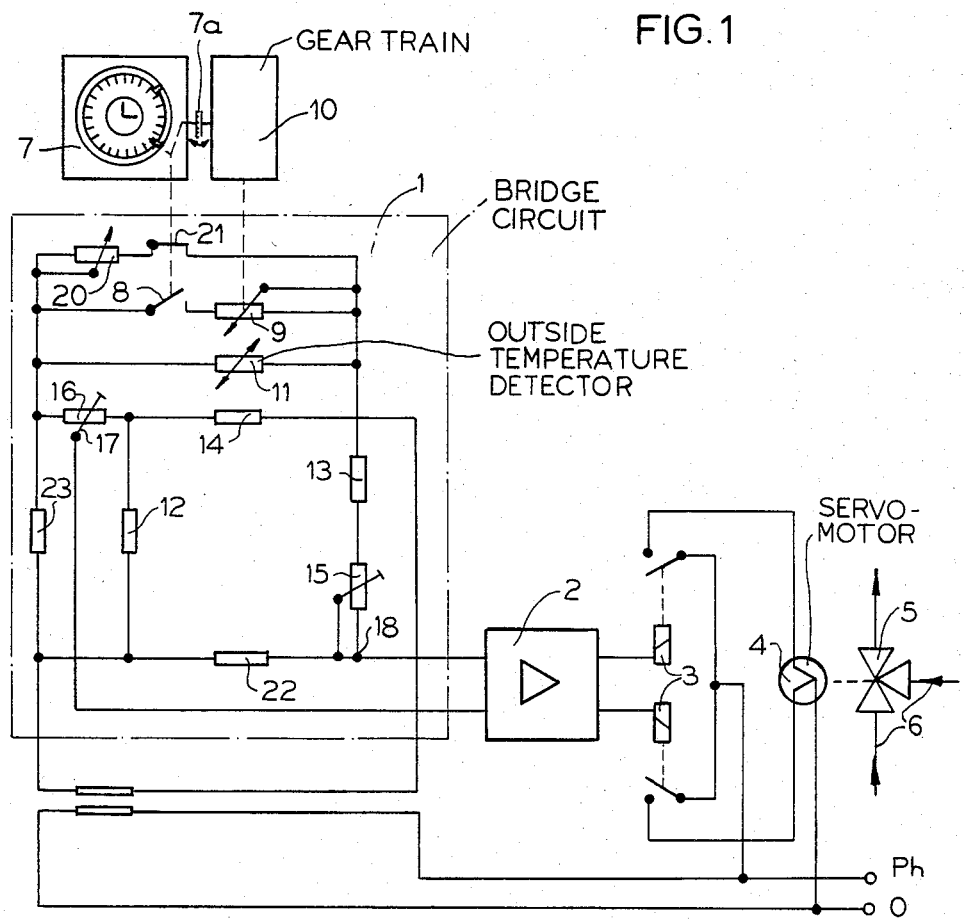
FIG. 1 is a schematic circuit diagram for a heat regulator constructed in accordance with the principles of the present invention.

A heat regulator as disclosed and claimed herein is shown in FIG. 1 including a bridge circuit 1 which supplies a signal to an electronic signal amplifier 2 for operating an electro-magnetic contact switch means 3. The switch means 3 is operable for connecting a line voltage Ph across a servomotor 4 for operating a mixing valve 5 disposed in a heat circulation means 6. The regulator further includes a switch clock 7 having an electrical switch contact 8. The time at which the switch contact 8 is closed by the switch clock 7 is selectable by means of controls on the switch clock. Closure of the switch contact 8 connects a variable resistor 9 in series with the switch contact 8 into a branch of the bridge circuit 1.

The variable resistor 9 is mechanically coupled to a gear train 10 engageable via an engagement means 7a with the switch clock 7. The gear train 10 is driven beginning at the same switching time at which the switch contact 8 of the switch clock 7 is actuated, and continues to be driven so that the resistance value of the variable resistor 9 is time-controlled. Drive of the gear train 10 and thus the change in the resistance value of the variable resistor 9 can ensue proceeding from the chronometer element of the switch clock 7. The gear train 10 may be a separate element engaged with the switch clock 7, or may be encompassed within the switch clock 7 as a single unit.

The bridge circuit 1 also includes an outside temperature detector or sensor 11 which is connected in a branch of the bridge circuit in parallel with the variable resistor 9 and the switch contact 8. The bridge circuit 1 further includes fixed resistances 12, 13, 14, 22 and 23 selected in a known manner.

The bridge circuit also includes another variable resistor 15 for compensating for the lead temperature of a heating agent, such as water. The resistor 15 is connected to a node 18 of the bridge circuit 1 which is in turn connected to the amplifier 2. As can be seen in FIG. 1, one half of the bridge circuit 1 is redundantly designed. The bridge branches in this bridge half are connected in parallel to one another. Both bridge branches are connected to a variable resistor 16 having a center tap 17 connected to the signal amplifier 2. The steepness of the heating curve can be set by means of the variable resistor 16.

The regulator shown in FIG. 1 operates as follows. After setting the steepness of the heating curve and accounting for the lead temperature by means of the respective variable resistors 16 and 15, a determination based on calculations taken into account room capacity, insulation, climatic zone, and other relevant factors is undertaken as to whether, for example, a two hour heat supply period is sufficient in order to reach a desired room temperature at a desired point in time given, for example, a lowest outside temperature of −15° C., a desired room temperature of +20° C., and a nighttime temperature lowering of approximately 5° C. In this case, a switch rider on the indexing disc of the switch clock 7 is programmed so as to be set back in time by two hours relative to the desired point in time. The scale of the indexing disc may, for example, be attached offset by two hours relative to the switching time in order to accomplish this purpose. Accordingly, the switch rider actuates the switch contact 8 two hours before the desired point in time and, directly or indirectly, simultaneously places the gear train 10 in operation for varying the resistance of the variable resistor 9 over time.

Figure 2:
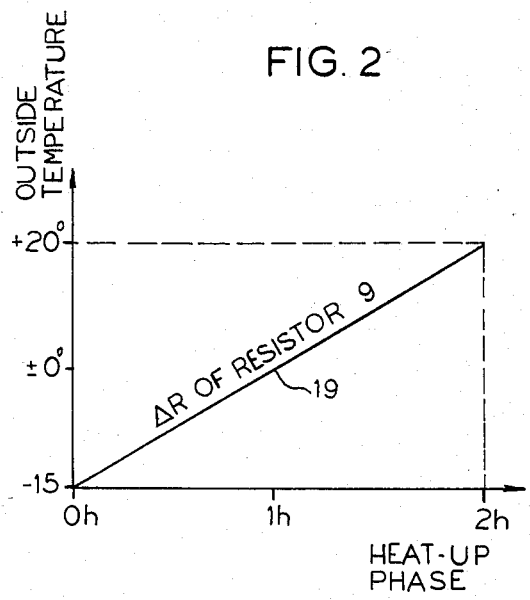
FIG. 2 is a temperature/time diagram showing the chronological length of a heat supply phase of the regulator shown in FIG. 1 as a function of the outside temperature.

If, for example, an outside temperature of −15° C. prevails, as shown in FIG. 2 the supply of heat begins immediately. The supply of heat is terminated by the timer 7 opening the switch 8 at the desired point in time when the desired room temperature is, based on the calculations, assumed to have been reached.

If, however, an outside temperature of only 0° C. prevails, as shown by the curve 19 in FIG. 2, supply of heat begins only one hour before the point in time at which the desired room temperature is to be reached. In this case, the time-controlled resistance value of the variable resistor 9 reaches the coincident value of the outside temperature sensor 11 only after one hour.

If, however, an outside temperature of, for example, 15° C. prevails, the time-controlled resistor 9 shifts the beginning of heat supply to approximately 10 minutes before the point in time at which the desired room temperature is to be reached.

Figure 3:
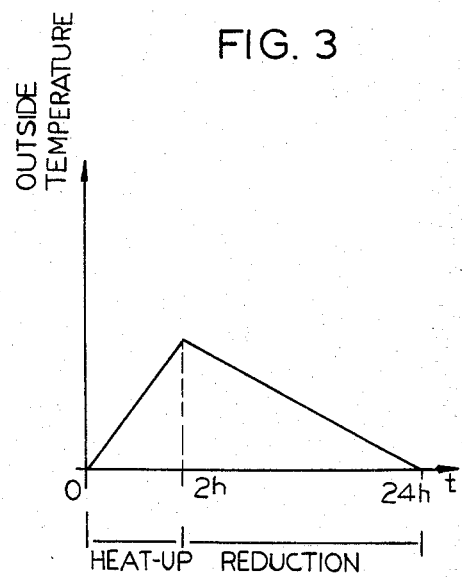
FIG. 3 is a temperature/time diagram showing the temperature increase and reduction as regulated by the regulator shown in FIG. 1, as a function of the outside temperature for a 24-hour control cycle.

Preselection of the nighttime temperature lowering can be selected by means of a variable resistor 20 in the bridge circuit 1 which can be controlled in a known manner by a further switch contact 21. The heat regulator disclosed and claimed herein permits optimum preselection of the supply of heat which can be begun at a point in time directly before the desired point in time at which the desired temperature is to be reached, Comparable results can be achieved if, in place of the gear train 10 coupled to the variable resistor 9, a variable resistor is utilized in the bridge circuit 1 having a middle tap which, after termination of a supply of heat, remains at its highest or lowest value, that is, executes only half a revolution between termination of the nighttime temperature lowering phase and termination of the heat supply period while traversing the other half revolution in a temperature lowering phase as schematically shown in FIG. 3 over a 24 hour cycle.

The regulator disclosed and claimed herein is not limited to the bridge circuit described above, but may also be employed in any other circuit such as, for example, a voltage divider circuit. It is also possible to undertake chronological control of the resistance of the variable resistor 9 or of some other comparable element by means of a time-lag relay controlled by a switch clock and capable of mechanically operating the variable resistor 9. A control means may also be employed without departing from the inventive concept disclosed and claimed herein which supplies a control signal corresponding to the outside temperature, such as a digital signal, to an electronic counter connected at the position of the signal amplifier 2 for further processing the information. In this embodiment, the analog signals of the variable resistor 9 and of the outside temperature sensor 11 may be digitized by known methods or, in place of the variable resistor 9 and the outside temperature sensor 11, pulse generators in the form of variable oscillators may be directly utilized.

The drive train 10 for operating the variable resistor 9 may also be modified so as to vary the resistance of the variable resistor 9 at a faster or slower rate depending on the value of the resistance of the outside temperature sensor 11. For example, the function range may be traversed in two hours if the outside temperature is −35° C., whereas if the outside temperature is +15° C., the function range may be traversed in 10 minutes.

Although other modifications and changes may be suggested by those skilled in the art it is the intention of the inventor to embody within the patent warrented hereon all changes and modifications as reasonably and properly come within the scope of his contribution to the art.

I claim as my invention:

1. A time-controlled heat regulator for controlling a means for supplying heat to an area to be heated comprising:
    a control loop including a variable resistor and an outside temperature sensor exhibiting a resistance corresponding to the value of temperature outside of said heated area;
    a means for cutting said variable resistor into said control loop at a beginning of a longest possible period which may be needed to raise the temperature of said area to a desired temperature, the beginning of said period being selected in dependence upon said outside temperature; and
    a means for chronologically changing the resistance of said variable resistor after said variable resistor is cut into said control loop, said regulator activating said means for supplying heat when the resistance of said variable resistor equals said resistance corresponding to said outside temperature and deactivating said means for supplying heat at the end of said period.

2. The heat regulator of claim 1 wherein said means for cutting said variable resistor into said control loop is a switch clock having a switch contact connected in series with said variable resistor in said control loop.

3. The heat regulator of claim 2 wherein said means for chronologically varying the resistance of said variable resistor is a drive train connected to said switch clock and mechanically coupled to said variable resistor.

4. The heat regulator of claim 3 wherein said switch clock and said gear train are combined in a single unit.

5. The heat regulator of claim 1 wherein said variable resistor has a center tap such that one half of the resistance of said variable resistor is utilized for a heat-up phase of said regulator and the other half of the resistance of said variable resistor is utilized for a heat-reduction phase of said regulator.

6. A time-controlled heat regulator for controlling the operation of a servomotor for regulating the supply of heat to an area to be heated comprising:
- a bridge circuit having a variable resistor and an outside temperature sensor exhibiting a resistance value corresponding to a temperature outside of said heated area;
- a means for cutting said variable resistor into said bridge circuit at a beginning of a longest possible chronological heat-up phase of said regulator, said longest possible heat-up phase being determined by the value of said outside temperature;
- a means for chronologically changing the value of said variable resistor after said variable resiistor is cut into said bridge circuit; and
- a means interconnected between said bridge circuit and said servomotor for operating said servomotor to supply heat to said area to be heated beginning when said bridge circuit is in equilibrium when the resistance of said variable resistor is equal to the resistance of said outside temperature sensor and terminating a pre-determined time after said variable resistor is cut into said circuit.

7. The heat regulator of claim 6 wherein said means for cutting said variable resistor into said bridge circuit is a switch clock having a switch contact connected in series with said variable resistor in said bridge circuit.

8. The heat regulator of claim 7 wherein said means for chronologically varying the resistance of said variable resistor is a gear train operated by said switch clock and mechanically coupled to said variable resistor.

* * * * *